United States Patent
Krneta et al.

(10) Patent No.: US 11,907,092 B2
(45) Date of Patent: Feb. 20, 2024

(54) QUANTUM COMPUTING MONITORING SYSTEM

(71) Applicant: Amazon Technologies, Inc., Seattle, WA (US)

(72) Inventors: Milan Krneta, Seattle, WA (US); Eric M Kessler, New Rochelle, NY (US); Christian Bruun Madsen, Longmont, CO (US); Michael D Pratt, Shoreline, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 17/525,723

(22) Filed: Nov. 12, 2021

(65) Prior Publication Data

US 2023/0153219 A1 May 18, 2023

(51) Int. Cl.
*G06F 11/32* (2006.01)
*G06N 10/00* (2022.01)
(Continued)

(52) U.S. Cl.
CPC ........ *G06F 11/328* (2013.01); *G06F 11/3006* (2013.01); *G06F 11/3495* (2013.01); *G06N 10/00* (2019.01)

(58) Field of Classification Search
CPC .............. G06F 11/328; G06F 11/3006; G06F 11/3495; G06N 10/00
(Continued)

(56) References Cited

U.S. PATENT DOCUMENTS 6,741,585 B1 5/2004 Munoz et al.
7,277,872 B2 10/2007 Raussendorf et al.
(Continued)

FOREIGN PATENT DOCUMENTS

EP 1701259 9/2006
EP 2557498 2/2013
(Continued)

OTHER PUBLICATIONS

Igor L. Markov, et al., "Quantum Supremacy is Both Closer and Farther than It Appears", arXiv: 1807.10749v3, Sep. 26, 2048. pp. 1-32.
(Continued)

*Primary Examiner* — Tan Doan
(74) *Attorney, Agent, or Firm* — Alexander A. Knapp; Kowert, Hood, Munyon, Rankin & Goetzel, P.C.

(57) ABSTRACT

A quantum computing monitoring system may receive a request from user describing an algorithm to be executed using classical and quantum computing resources and a metric to be monitored associated with execution of the algorithm at the quantum computing resources. In execution, the quantum computing monitoring system may cause measurements to be obtained from the quantum computing resources at individual steps of the execution of the algorithm at the quantum computing resources, and the metric to be determined based on the obtained measurements. The quantum computing monitoring system may evaluate the metric with respect to a threshold, and provide an alert to the user responsive to determining that the metric fails to satisfy the threshold. The quantum computing monitoring system may further perform an operation to modify the execution of the algorithm at the quantum computing resources as needed.

20 Claims, 8 Drawing Sheets

(51) Int. Cl.
*G06F 11/30* (2006.01)
*G06F 11/34* (2006.01)

(58) Field of Classification Search
USPC .......................................................... 709/224
See application file for complete search history.

(56) References Cited

U.S. PATENT DOCUMENTS

| | | | |
|---|---|---|---|
| 7,376,547 B2 | 5/2008 | Meredith | |
| 7,484,091 B2 | 1/2009 | Bade et al. | |
| 7,529,717 B2 | 5/2009 | Vala et al. | |
| 7,876,145 B2 | 1/2011 | Koch | |
| 7,996,836 B1 | 8/2011 | McCorkendale et al. | |
| 8,032,899 B2 | 10/2011 | Archer et al. | |
| 8,095,745 B1 | 1/2012 | Schmidt | |
| 8,127,292 B1 | 2/2012 | Dobrovolskiy et al. | |
| 8,190,553 B2 | 5/2012 | Routt | |
| 8,201,161 B2 | 6/2012 | Challener et al. | |
| 8,239,557 B2 | 8/2012 | McCune et al. | |
| 8,433,802 B2 | 4/2013 | Head et al. | |
| 8,514,868 B2 | 8/2013 | Hill | |
| 8,832,164 B2 | 9/2014 | Allen et al. | |
| 9,317,331 B1 | 4/2016 | Koh et al. | |
| 9,323,552 B1 | 4/2016 | Adogla et al. | |
| 9,361,145 B1 | 6/2016 | Wilson et al. | |
| 9,400,499 B2 | 7/2016 | Williams et al. | |
| 9,430,280 B1 | 8/2016 | Shih et al. | |
| 9,471,880 B2 | 10/2016 | Williams | |
| 9,485,323 B1 | 11/2016 | Stickle et al. | |
| 9,530,873 B1 | 12/2016 | Carroll et al. | |
| 9,537,953 B1 | 1/2017 | Dadashikelayeh et al. | |
| 9,660,859 B1 | 5/2017 | Dadashikelayeh et al. | |
| 9,870,273 B2 | 1/2018 | Dadashikelayeh | |
| 9,979,694 B2 | 5/2018 | Brandwine et al. | |
| 10,043,035 B2 | 8/2018 | LaFever | |
| 10,095,537 B1 | 10/2018 | Neogy et al. | |
| 10,275,721 B2 | 4/2019 | Dukatz et al. | |
| 10,482,413 B2 | 11/2019 | Paterra et al. | |
| 10,498,611 B1 | 12/2019 | Kloberdans et al. | |
| 10,592,216 B1 * | 3/2020 | Richardson | G06F 8/443 |
| 10,614,371 B2 | 4/2020 | Bishop et al. | |
| 10,817,337 B1 | 10/2020 | Richardson | |
| 10,997,519 B2 | 5/2021 | Gunnels | |
| 11,170,137 B1 | 11/2021 | Richardson et al. | |
| 11,222,279 B2 | 1/2022 | Gambetta | |
| 11,270,220 B1 | 3/2022 | Richardson et al. | |
| 11,605,016 B2 | 3/2023 | Heckey et al. | |
| 11,605,033 B2 | 3/2023 | Bolt et al. | |
| 2003/0121028 A1 | 6/2003 | Coury et al. | |
| 2003/0169041 A1 | 9/2003 | Coury et al. | |
| 2005/0013280 A1 | 1/2005 | Buddhikot et al. | |
| 2005/0251806 A1 | 11/2005 | Auslander et al. | |
| 2006/0224547 A1 | 10/2006 | Ulyanov et al. | |
| 2006/0225165 A1 | 10/2006 | Maassen van den Brink et al. | |
| 2007/0174227 A1 | 7/2007 | Johnson et al. | |
| 2007/0239366 A1 | 10/2007 | Hilton et al. | |
| 2007/0294070 A1 | 12/2007 | Yamashita | |
| 2008/0244553 A1 | 10/2008 | Cromer et al. | |
| 2008/0313430 A1 | 12/2008 | Bunyk | |
| 2009/0070402 A1 | 3/2009 | Rose et al. | |
| 2010/0070970 A1 | 3/2010 | Hu et al. | |
| 2011/0075667 A1 | 3/2011 | Li et al. | |
| 2011/0131443 A1 | 6/2011 | Laor et al. | |
| 2013/0167123 A1 | 6/2013 | Dura et al. | |
| 2013/0179330 A1 | 7/2013 | Quillian | |
| 2014/0187427 A1 | 7/2014 | Macready et al. | |
| 2014/0208413 A1 | 7/2014 | Grobman et al. | |
| 2014/0264288 A1 | 9/2014 | Svore et al. | |
| 2015/0160884 A1 | 6/2015 | Scales et al. | |
| 2015/0339417 A1 | 11/2015 | Garcia-Ramirez et al. | |
| 2016/0026573 A1 | 1/2016 | Jacobs et al. | |
| 2016/0077845 A1 | 3/2016 | Earl et al. | |
| 2016/0170781 A1 | 6/2016 | Liguori et al. | |
| 2016/0170785 A1 | 6/2016 | Liguori et al. | |
| 2016/0328253 A1 | 11/2016 | Majumdar | |
| 2017/0017894 A1 | 1/2017 | Lanting et al. | |
| 2017/0177782 A1 | 6/2017 | Hastings et al. | |
| 2017/0194930 A1 | 7/2017 | Wiebe et al. | |
| 2017/0223094 A1 | 8/2017 | Johnson et al. | |
| 2017/0228483 A1 | 8/2017 | Rigetti et al. | |
| 2017/0286858 A1 | 10/2017 | La Cour et al. | |
| 2017/0300354 A1 | 10/2017 | Dalal et al. | |
| 2017/0357539 A1 | 12/2017 | Dadashikelayeh et al. | |
| 2017/0364796 A1 | 12/2017 | Wiebe et al. | |
| 2017/0366606 A1 | 12/2017 | Ben-Shaul et al. | |
| 2018/0046933 A1 | 2/2018 | La Cour et al. | |
| 2018/0107526 A1 | 4/2018 | Dadashikelayeh | |
| 2018/0107939 A1 | 4/2018 | Schoennenbeck et al. | |
| 2018/0218281 A1 * | 8/2018 | Reinhardt | G05B 19/042 |
| 2018/0232649 A1 | 8/2018 | Wiebe et al. | |
| 2018/0232653 A1 | 8/2018 | Selvanayagam | |
| 2018/0260125 A1 | 9/2018 | Botes et al. | |
| 2018/0260731 A1 | 9/2018 | Zeng et al. | |
| 2018/0307988 A1 | 10/2018 | Fano et al. | |
| 2018/0308000 A1 | 10/2018 | Dukatz et al. | |
| 2018/0365585 A1 | 12/2018 | Smith et al. | |
| 2018/0373540 A1 | 12/2018 | Bao et al. | |
| 2019/0042677 A1 * | 2/2019 | Matsuura | G06N 10/00 |
| 2019/0222748 A1 | 7/2019 | Weir | |
| 2019/0370679 A1 | 12/2019 | Curtis | |
| 2019/0378047 A1 | 12/2019 | Pistoia | |
| 2020/0364601 A1 * | 11/2020 | Yamazaki | G06N 5/01 |
| 2020/0387822 A1 | 12/2020 | Kilmov | |
| 2021/0193270 A1 | 6/2021 | Stober | |
| 2021/0201189 A1 | 7/2021 | Gunnels | |
| 2021/0357797 A1 | 11/2021 | Karalekas | |
| 2021/0357799 A1 | 11/2021 | Ducore | |
| 2022/0051112 A1 * | 2/2022 | Wang | G06N 5/022 |
| 2022/0083887 A1 * | 3/2022 | Ruedinger | G06N 10/00 |

FOREIGN PATENT DOCUMENTS

| | | |
|---|---|---|
| WO | 2015121619 | 8/2015 |
| WO | 2019222748 | 11/2019 |
| WO | 2020072819 | 4/2020 |

OTHER PUBLICATIONS

U.S. Appl. No. 16/196,723, filed Nov. 20, 2018, Anthony Nicholas Liguori, et al.

Ozgur Ulusoy, "Processing Real-Time Transactions in a Replicated Database System," 1994 Kluwer Academic Publishers, Boston, Revised Sep. 10, 1993, pp. 1-32.

Sergio Almeida, et al., "ChainReaction: a Causal+ Consistent Datastore based on Chain Replication," Eurosys'13 Apr. 15-17, 2013, Prague, Czech Republic, Copyright 2013 ACM 978-1-4503-1994—Feb. 13, 2004, pp. 85-98.

Scott Lystig Fritchie, "Chain Replication in Theory and in Practice," Erlang'10, Sep. 30, 2010, Baltimore, Maryland, USA. Copyright 2010 ACM 978-1-4503-0253—Jan. 10, 2009, pp. 1-11.

Robbert van Renesse, et al, "Chain Replication for Supporting High Throughput and Availability," USENIX Association, OSDI 2004: 6th Symposium on Operating Systems Design and Implementation, pp. 91-104.

Philip A. Bernstein, et al, "Concurrency Control and Recovery in Database Systems," Addison-Wesley Publication Company, ISBN 0-201-10715-5, 1987, pp. 1-58.

Xen, "Dom0" downloaded Jun. 6, 2016 from http://wiki.xen.org/wiki/Dom0, last updated Mar. 29, 2015, pp. 1-2.

Amazon Web Services, "Amazon Elastic Compute Cloud: User Guide for Linux Instances," Latest Version update 2015, pp. 1-816.

IBM, General Information, Version 4, Release 3.0, Fifth Edition, Apr. 2002, pp. 1-101.

From Wikipedia, the free encyclopedia, "Hypervisor," downloaded Jun. 6, 2016 from https://en.wikipedia.org/wiki/Hypervisor, pp. 1-7.

Axel Buecker, et al., "Reduce Risk and Improve Security on IBM Mainframes: Volume 1 Architecture and Platform Security," Redbooks, IBM, Dec. 2014, pp. 1-308.

From Wikipedia, the free encyclopedia, "VMware ESX," downloaded Jun. 6, 2016 from https://en.wikipedia.org/wiki/VMware_ESX, pp. 1-13.

(56) References Cited

OTHER PUBLICATIONS

From Wikipedia, the free encyclopedia, "Xen," downloaded from Jun. 6, 2016 from https://en.wikipedia.org/wiki/Xen, pp. 1-12.
Udo Steinberg, et al., "NOVA: A Microhypervisor-Based Secure Virtualization Architecture", ACM, EuroSys'10, Apr. 13-16, 2010, pp. 209-222.
Sangster, et al., TCG Published, Virtualized Trusted Platform Architecture Specification, Specification Version 1.0, Revision 0.26, Sep. 27, 2011, pp. 1-60.
Network Functions Virtualisation (NFV); NFV Security; Security and Trust Guidance, ETSI GS NFV-SEC 003, V1.1.2, downloaded by EP on Jun. 4, 2016, pp. 1-57.
Cong Xu, et al., "vSlicer: Latency-Aware Virtual Machine Scheduling via Differentiated-Frequency CPU Slicing", Purdue University, Purdue e-Pubs, 2012, pp. 1-14.
Amazon Web Services, "Amazon Elastic Compute Cloud: User Guide for Linux Instances," Latest Version update 2018, pp. 1-884.
Amazon Web Services, "Amazon Elastic Container Service: Developer Guide" API Version, Nov. 13, 2014, pp. 1-386.
Amazon Web Services, "AWS Lambda: Developer Guide" 2018, pp. 1-539.
AWS, "Annoucing Amazon EC2 Bare Metal Instances (Preview)", Retrieved from URL: https://aws.amazon.com/aboutaws/whats-new/2017/11/announcing-amazon-ec2-bare-metal-instances-preview/ on Jan. 15, 2018, pp. 1-4.
Brendan Gregg's Blog, "AWS EC Virtualization 2017: Introducing Nitro", Retrieved from URL: http://www.brendangregg.com/blog/2017-11-29/aws-ec2-virtualization-2017.html, pp. 1-11.
U.S. Appl. No. 16/698,698, filed Nov. 27, 2019, Derek Bolt, et al.
U.S. Appl. No. 16/698,674, filed Nov. 27, 2019, Jeffrey Paul Heckey, et al.
U.S. Appl. No. 16/698,732, filed Nov. 27, 2019, Jeffrey Paul Heckey, et al.
U.S. Appl. No. 16/698,737, filed Nov. 27, 2019, Christopher Kasprowicz.
U.S. Appl. No. 17/491,190, dated Sep. 30, 2021, Yunong, Shi.
U.S. Appl. No. 17/525,716, filed Nov. 12, 2021, Milan Kreta, et al.
U.S. Appl. No. 17/491,140, filed Sep. 30, 2021, Jeffrey Paul Heckey, et al.
Philipp Niemann, et al., "On the "Q" in QMDDs: Efficient Representation of Quantum Functionality in the QMDD Data-structure", Proceedings of the 5th International Conference on Reversible Computation, Jul. 2013, Source: http://.vww.informatik.uni-bremen.de/agra/doc/konf/13 rc eff _ qmdd _representation.pdf, pp. 125-140.
Jeff Barr, "Developer Preview—EC2 Instances (F1) with Programmable Hardware", AWS Blog, Nov. 30, 2016, Source: hllps://aws.amazon.com/blogs/aws/developer-preview-ec2-instances-f1-with-programmable-hardware, pp. 1-9.
Jeff Barr, "EC2 Instance Type Update—T2, R4, F1, Elastic GPUs, 13, C5", AWS Blog, Nov. 30, 2016, Source: https://aws.amazon.com/blogs/aws/ec2-instance-type-update-t2-r4-f1-elastic-gpus-i3-c5/, pp. 1-6.

Sebastian Anthony, "Google's Quantum Computing Playground turns your PC into a quantum computer", Extremetech, May 2014, Source: https://www.extremetech.com/extreme/182913-googles-quantum-computing-playground-turns-your-pc-into-a-quantum-computer, pp. 1-3.
Jeff Barr, "In the Works—Amazon EC2 Elastic GPUs", Nov. 30, 2016, Source: https://aws.amazon.com/blogs/aws/in-the-work-amazon-ec2-elastic-gpus/, pp. 1-6.
Jeff Barr, "New—Amazon EC2 Instances with Up to 8 NVIDIA Tesla V100 GPUs (P3)", AWS Blog, Oct. 25, 2017, Source: https://aws.amazon.com/blogs/aws/new-amazon-ec2-instances-with-up-to-8-nvidia-tesla-v100-gpus-p3/, pp. 1-6.
Jarrod R. McClean, et al., "OpenFermion: The Electronic Structure Package for Quantum Computers", Oct. 20, 2017, Source: https://arxiv.org/abs/1710.07629, pp. 1-18.
Barbara Kessler, "The Evolution of Manged Services in Hyperscale Cloud Environments", AWS Partner Network Blog, Sep. 28, 2016, Source: https://aws.amazon.com/blogs/apn/the-evolution-of-managed-services-in-hyperscale-cloud-environments/, pp. 1-7.
Grodzinsky, F.S., et al., "Quantum Computing and Cloud Computing: Humans Trusting Humans via Machines," IEEE International Symposium on Technology and Society (ISTAS), 2011, 5 pages.
Zeiter, Daniel, "A graphical development environment for quantum algorithms", Master's Thesis, Sep. 3, 2008, 51 pages, Retrieved from the Internet (https://doi.org/10.3929/ethz-a-005675863).
Svore, K. M., et al., "A Layered Software Architecture for Quantum Computing Design Tools", Computer, IEEE Computer Society, Jan. 2006, , pp. 74-83, vol. 39, Issue 1.
Rahaman, et al., "A Review on Progress and Prodblems and Qualtum Coputing as a Servce (Qcaas) in the Perspective of Cloud Computering," Global Journal of Computer Science and Technology, 2015, 6pg.
Singh, et al, "The Quantum Way of Cloud Computing," IEEE, 2014, 4 pgs.
U.S. Appl. No. 18/179,771, filed Mar. 7, Derek Bolt, et al.
International Search Report and Written Opinion dated Oct. 9, 2023 in PCT/US2022/079424, Amazon Technologies, Inc., p. 1-14.
Sim, Sukin, et al: "Adaptive pruning-based optimization of parameterized quantum circuits", arxiv.org, Cornell University Library, 201 Olin Library Cornell University Ithaca, NY 14853, Oct. 1, 2020, pp. 1-24.
Cerezo, M., et al: "Variational Quantum Algorithms", arxiv.org, Cornell University Library, 201 Olin Library Cornell University Ithaca, NY 14853, Oct. 4, 2021, pp. 1-33.
Rudolph, Manuel S., et al: "ORQVIZ: Visualizing High-Dimensional Landscapes in Variational Quantum Algorithms", arxiv.org, Cornell University Library, 201 Olin Library Cornell University Ithaca, NY 14853, Nov. 8, 2021, pp. 1-32.
Miceli, Raffaele, et al: "Quantum Computation and Visualization of Hamiltonians using Discrete Quantum Mechanics and IBM QISKit", 2018 New York Scientific Data Summit (NYSDS), IEEE, Aug. 6, 2018, pp. 1-6, [retrieved on Nov. 16, 2018].

* cited by examiner

QUANTUM COMPUTING MONITORING SYSTEM

BACKGROUND

A provider network may allow users to access services, via network connections, that are implemented using resources at locations remote from the users. Such services may be said to reside "in the cloud." A cloud-based quantum computing service may provide users access to quantum computers (also called quantum processing units) of various quantum hardware providers. Quantum computers utilize the laws of quantum physics to process information. Compared to classical (binary) computers, quantum computers work with quantum bits (or qubits). Qubits can experience the phenomena of "superposition" and "entanglement." Superposition allows a qubit to be in multiple states at the same time. For example, whereas a classical computer is based on bits that are either zero or one, a qubit may be both zero and one at the same time, with different probabilities assigned to zero and one. Entanglement is a strong correlation between qubits, such that the qubits are inextricably linked in unison even if separated by great distances. By using superposition and entanglement, quantum computers have the potential to process information in new ways to solve computational problems that are beyond the reach of classical computers.

Figure 1:
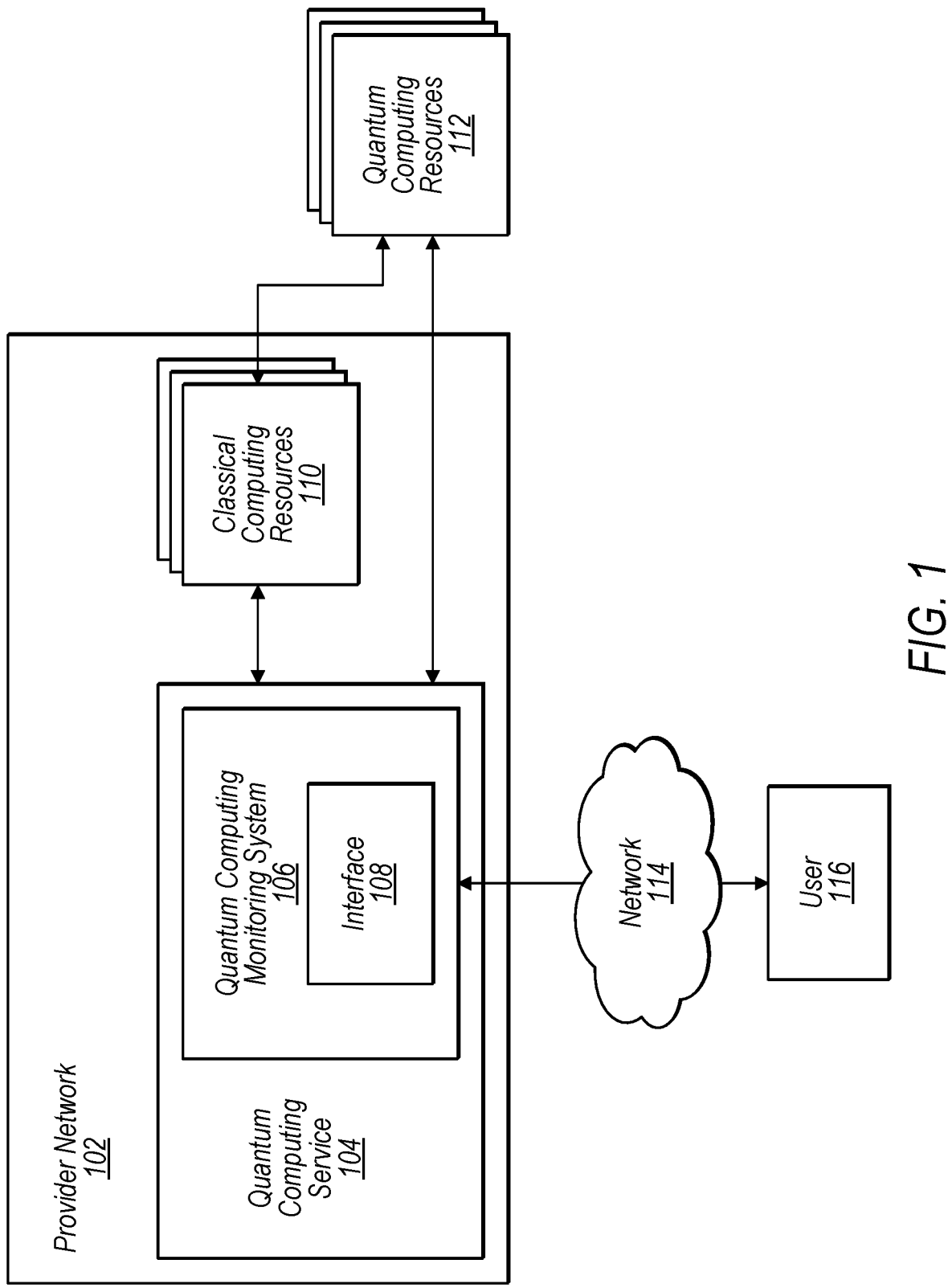
FIG. 1 is a block diagram showing an example provider network that includes a quantum computing monitoring system, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to.

Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

A provider network may provide users access to different types of computing resources, such as classical computing resources (e.g., computing resources implemented and/or operated based on binary bits, such as classical (binary) computers, GPUs, ASICs, etc.) and quantum computing resources (e.g., computing resources implemented and/or operated based on qubits, such as quantum computers or quantum processing units (QPUs)). In such scenarios, a user may use a combination of classical and quantum computing resources to execute an algorithm. For example, one portion of an algorithm may be executed at a classical computing resource, and another portion of the algorithm may be executed at a quantum computing resource, where the different computing resources may iteratively exchange data with each other to move forward execution of the overall algorithm. For example, at a step of execution of the algorithm at the quantum computing resource, the quantum computing resource may receive data from the classical computing resource. The data received from the classical computing resource may include calculation results of a corresponding step at the classical computing resource. Based on the data from the classical computing resource, the quantum computing resource may proceed to complete execution of a quantum portion of the algorithm, and in return provide calculation results back to the classical computing resource. Next, the classical computing resource may use the data received from the quantum computing resource to perform execution at the classical computing resource. The iterative process may continue until execution of the entire algorithm completes or aborts.

Sometimes it is desirable for a provider network to provide users ability to monitor and/or adjust execution of algorithms at cloud-based computing resources. For example, a user may use computing resources offered by a provider network on a pay-as-you-go basis. In that case, users may only need and want to pay for the computing resources that they actually use. However, for some algorithms involving both classical computing resources and quantum computing resources, optimization may not converge or the algorithm may fail to progress. In that case, it may take a while for users to recognize that the algorithm has stalled and/or is failing to make progress. This can cause unnecessary waste of computing resources and/or costs to the users. For example, quantum computing resources may be limited and costly to reserve and use. Thus, when issues like this occur, it is desirable that alerts can be provided to users in real time, such as while the algorithm is executing as opposed to at a later time when the algorithm has run for hours or days, as an example, without making progress.

Further, in such incidents, it is also desirable to allow users to modify execution of algorithms as needed. For example, when an algorithm involving quantum computing stalls, a user may prefer to cancel the execution and release the quantum computing resources (and associated classical computing resources) to avoid continuously incurring unnecessary costs. In addition, for classical computing, time is generally used as a scale for measuring computing progress assuming time per step to be constant. However, unlike purely classical computing algorithms, algorithms including a quantum computing portion can take variable amounts of time to implement and run. Thus, time is no longer a good measure of progress. Thus, it is desirable for the provider network to provide monitoring that provides a better representation of the progress of algorithm execution than what is provided if using a metric versus time to determine progress.

Various embodiments described herein relate to a quantum computing monitoring system. In some embodiments, the quantum computing monitoring system may be implemented as part of a provider network that provides users access to a quantum computing service offered by the provider network, which may further provide users access to various quantum computing resources. In some embodiments, the quantum computing resources may include various quantum computers included in the provider network, quantum processing units (QPUs) of quantum hardware providers (QHPs) associated with the provider network. In some embodiments, such quantum hardware may be implemented using qubits built from superconductors, trapped ions, semiconductors, photonics, etc, or other suitable quantum computing technologies.

In some embodiments, the quantum computing monitoring system may provide a user interface, through which users may provide algorithms for execution at different types of computing resources. In some embodiments, a user may describe an algorithm for execution in a request. For example, as described in detail below, an algorithm may be composed into a script file and/or a graphic diagram file, and the request may include a job description that identifies the script or graphic diagram file to be provided to the provider network for execution. In some embodiments, the request may further describe one or more user specified metrics to be monitored during execution of the algorithm, especially during execution of portion(s) of the algorithm at quantum computing resources and/or for hybrid portions of the algorithm involving both quantum and classical computing resources. Responsive to the request, the quantum computing monitoring system may cause measurements to be obtained from the quantum computing resources, post processing to be performed at the classical computing resource on the raw quantum measurements, metrics to be determined based on the post-processed measurements, and then provide representations of the determined metrics to be logged or otherwise made available to the user during the execution of the algorithm. In some embodiments, the measurements collection and metrics determination may be performed by the classical computing resources under instructions of the quantum computing monitoring system. For example, at the end of each step of the quantum computing, the measurements may be reported by the quantum computing resources to the classical computing resources, or may be pooled from the quantum computing resources by the classical computing resources. Based on the measurements, the classical computing resources may determine the metrics and provide them to the quantum computing monitoring system.

In some embodiments, the quantum computing monitoring system may provide an application programmatic interface (API) defining a schema for receiving such metrics. Also, in some embodiments, a script file comprising the user's algorithm may also include program instructions for generating such metrics and invoking a quantum computing monitoring system API for reporting and/or logging such metrics during the execution of the algorithm. In some embodiments, such a script file may further define what constitutes a "step" or "iteration" of the algorithm. For example, an algorithm may include conditional logic for execution of one or more quantum circuits and/or one or more classical computing portions. In some circumstances, execution of multiple quantum circuits and/or multiple classical computing portions may constitute a single step (as defined by the user). Also, in some embodiments, respective quantum circuits may be executed on a quantum computing device a specified number of times (e.g., a number of "shots"). Because steps of the algorithm may involve different types or numbers of quantum circuits that may be executed for different numbers of shots, the various steps may have durations that vary considerably. Due to this, a metric for the algorithm may not increase during execution of a step, but may be adjusted at the completion of a step. If the metric is plotted versus time, it may not appear to be making progress at an acceptable rate. But when plotted versus step number, a more accurate representation of progress may be presented.

In some embodiments, the request from the user may further describe one or more thresholds representative of desired progress of the algorithm execution. Accordingly, the quantum monitoring system may evaluate the metrics with respect to the thresholds. For example, the quantum monitoring system may compare values of the metrics versus those of the thresholds. When the metrics fail to satisfy the threshold, the quantum computing monitoring system may consider that algorithm including the quantum computing portion, has failed to make the desired progress. In response, the quantum computing monitoring system may provide an alert to the user. Given that the metrics are monitored and evaluated during execution of the algorithm, the alert may be provided almost in real time. This may allow a user to abort execution of the algorithm if progress is unsatisfactory prior to incurring costs for further execution of the algorithm.

In some embodiments, when the metrics fail to satisfy the thresholds, the quantum computing monitoring system may allow the user to modify execution of the algorithm. For example, the quantum computing monitoring system may allow the user to prescribe one or more operations, such as adjusting a number of shots to be performed, etc. In some embodiments, the operations may include cancelation of the execution at the quantum computing resources. In some embodiments, this may also stop the execution at the classical computing resources. In some embodiments, the operations may include adjustments to execution settings and/or algorithm parameters, based on which the algorithm may be re-executed. In some embodiments, the above may be implemented as an automated process. For example, the user may describe the operations in the request describing the algorithm and metrics. Accordingly, when the quantum monitoring system evaluates the metrics, the quantum monitoring system may automatically perform the operations as needed.

As described above, in some embodiments, quantum computing can take a variable amount of time to implement and run and thus time is no longer a good measure of progress. Thus, in some embodiments, the monitoring may be performed with respect to steps of the quantum computing or steps of the overall algorithm, but not necessarily at constant time intervals. In other words, the quantum computing monitoring system may cause measurements to be obtained, metrics to be determined, evaluation of the metrics to be performed, alerts to be provided, and/or other operations to be performed if needed, at the end of individual steps, though not necessarily at evenly distributed time intervals. As described below, in some embodiments, a user may specify the steps for the quantum computing, such as in a user submitted script file. For example, the request from the user may describe that each step includes m number of tasks and each task may be repeatedly executed for multiple shots at the quantum computing resources for n number of times.

In some embodiments, the quantum computing monitoring system may provide a predetermined list of metrics that can be monitored during quantum computing, and the user may select one or more to be actually monitored from the list. In execution, the quantum computing monitoring system may perform monitoring according to the user's selection. Alternatively, in some embodiments, the quantum computing monitoring system may allow the user to provide customized metrics for monitoring. In that case, the user may also identify measurements to be obtained from the quantum computing resources, and provide calculation algorithms to be performed for determining the customized metrics. In some embodiments, a quantum computing monitoring system may provide a user with a script template generated based on a user's selection of monitoring metrices and/or monitoring parameters selected from a predetermined list provided by the quantum computing monitoring system. The script template and the user's algorithm may be executed at a classical computing resource that executes classical computing portions of the user's algorithm. The script template may be provided with pre-configured API calls to an API of the quantum computing monitoring system, wherein the API logs the user selected metrics and user specified step numbers during execution of the algorithm. For example, an API call may specify "step #", "metric A", "metric A value", "metric B", "metric B value" etc. In some embodiments, the definition of what constitutes a step, a definition of a metric, and a definition of how a metric value for a given named metric is to be calculated may be determined by a user, such as in a user submitted script, or may be provided on behalf of the user in a script template based on a user selection for a predetermined list of metrics or other monitoring parameters provided by the quantum computing monitoring system.

FIG. 1 is a block diagram showing an example provider network that includes a quantum computing monitoring system, according to some embodiments. In FIG. 1, provider network 102 may include quantum computing monitoring system 106. For purposes of illustration, in this example, quantum computing monitoring system 106 may be implemented as part of quantum computing service 104 offered by provider network 102. Alternatively, in some embodiments, quantum computing monitoring system 106 may be implemented separately from quantum computing service 104, two of which may be operatively coupled with each other via network connections.

In some embodiments, quantum computing monitoring system 106 may include user interface 108, through which user 116 may access quantum computing monitoring system 106 and/or quantum computing service 104 via network 114. For purposes of illustration, in this example, it is assumed that user interface 108 is implemented as part of quantum computing monitoring system 106. In some embodiments, user interface 108 may be part of quantum computing service 104, but outside quantum monitoring system 106. For example, in some embodiments, user 108 may include multiple parts, e.g., one part for receiving request from user 116 and another part for providing determined metrics to user 116. In some embodiments, user interface 108 may include a graphic user interface, a command line console (CLI), an application programming interface (API), and the like. In some embodiments, user 116 may access user interface 108 via an integrated development environment (IDE) that is installed at the user's local computer using a software development kit (SDK). In some embodiments, network 114 may include wired and/or wireless network connections. In some embodiments, provider network 102 may also provide user 116 access to various computing resources, such as one or more classical computing resources 110 and one or more quantum computing resources 112. For purposes of illustration, in this example, it is assumed that quantum computing resources 112 are offered by a separate entity from provider network 102. Alternatively, in some embodiments, quantum computing resources 112 may be part of provider network 102. Also, in some embodiments, quantum computing resources 112 may be operated by a quantum hardware provider (QHP) that makes quantum processing units (QPU) available to provider network 102 to be used to execute quantum tasks on behalf of users of provider network 102. In some embodiments, classical computing resources 110 may include various computing resources implemented and/or operated based on binary bits, such as classical (binary) computers, GPUs, ASICs, etc. By comparison, quantum computing resources 112 may include various computing resources implemented and/or operated based on qubits, such as quantum computers, quantum computing units (QPUs), or quantum hardware using superconductors, trapped ions, semiconductors, photonics, etc.

In some embodiments, user 116 may provide a request to quantum computing monitoring system 106 via user interface 108 associated with an algorithm to be executed using different types of computing resources, such as classical computing resources 110 and quantum computing resources 112. In some embodiments, the request associated with the algorithm may describe the algorithm or indicate the algorithm that is stored in provider network 102. For example, in some embodiments, the algorithm may be composed into one or more script files using quantum computing languages, such as Quil, Open QASM, cQASM, etc. In some embodiments, the algorithm may be represented by one or more graphic diagram files including quantum gates. Either way, the request may describe the algorithm by including algorithm files in the request or identifying the files or a storage location of the files in provider network 102. In some embodiments, the algorithm (e.g., the files of the algorithm) may be first converted to an executable format and then sent to the different computing resources for execution, such as to a quantum computing resource and/or classical computing resource that coordinates with a quantum computing resource to execute the algorithm. In some embodiments, the conversion of the algorithm may include first translating at least part of the algorithm into quantum gates, and then compiling the quantum gates into executable code. In some embodiments, the conversion may be performed at quantum computing monitoring system 106 and/or quantum computing service 104. In some embodiments, quantum computing monitoring system 106 may additionally add a monitoring script to a set of files to be executed at a classical computing resource, where the set of files comprise the compiled algorithm. The added script may be determined based on user monitoring selections. Alternatively, the quantum computing monitoring system may include a user provided monitoring script with a compiled version of the algorithm provided to a classical computing resource for execution. In either embodiment, the classical computing resource may coordinate with a quantum computing resource to execute quantum tasks included in the algorithm.

In some embodiments, the request from user 116 may further describe one or more metrics to be monitored during execution of the algorithm. For purposes of illustration, consider an example algorithm to solve for an energy state of electrons in molecules. In such an example, the Hamiltonian state and/or the lowest energy of a molecular system may be considered a metric for reflecting progress of the algorithm execution. For example, the Hamiltonian state may refer to the total energy of a molecule, whereas the lowest energy may correspond to the lowest energy of the molecule. One indication of the quantum computing progress may be whether the Hamiltonian state and/or the lowest energy is trending towards a minimum during execution. In some embodiments, a user may provide an initial guess (e.g., ansatz state) and range for the Hamiltonian. If the currently computed minimum energy state is outside of the provided range relative to the initial guess, the quantum computing monitoring system may provide an alert and/or stop further execution of the algorithm. As another example, if the minimum energy state does not improve (e.g., find a lower minimum) over a threshold number of iterations of the algorithm, the quantum computing monitoring system may determine that further execution of the algorithm is unlikely to provide an improved result and therefore stop further execution of the algorithm. In some embodiments, such threshold may be defined by a user or selected from lists provided by the quantum computing monitoring system. In some embodiments, a user may select a metric to be provided from a list provided by the quantum computing monitoring system and may further provide an initial guess and upper/lower boundaries to be used in monitoring the algorithm.

In some embodiments, responsive to receiving the request from user 116, quantum computing monitoring system 106 and/or quantum computing service 104 may analyze the algorithm provided by user 116, and send one or more portions of the algorithm for execution at classical computing resources 110, and one or more other portions of the algorithm for execution at quantum computing resources 112. Classical computing resources 110 and quantum computing resources 112 may iteratively exchange data with one another to execute the entire algorithm.

In some embodiments, quantum computing monitoring system 106 may use classical computing resources 110 to facilitate the monitoring of metrics described by the request from user 116. For example, at the end of each step, quantum computing monitoring system 106 may use classical computing resources 110 to obtain one or more measurements from quantum computing resources 112. In some embodiments, the measurements may be reported from quantum computing resources 112 to classical computing resources 110. Alternatively, in some embodiments, the measurements (and the other data) may be pooled from quantum computing resources 112 by classical computing resources 110.

In some embodiments, when the measurements are obtained, the metrics may be determined based on the obtained measurements. In some embodiments, determination of the metrics may be performed at classical computing resources 110. Consider the foregoing example. In some embodiments, quantum computing resources 112 may implement one or more qubit gates to represent electrons of a molecule, and a Hamiltonian gate to measure the total energy of the molecule. At the end of each step, classical computing resources 110 may obtain measurements of states of the individual qubit gates and Hamiltonian state from quantum computing resources 112. Based on the measurements, classical computing resources 110 may further determine the Hamiltonian state and/or the lowest energy of the molecule system. In some embodiments, the measurements and/or metrics may be stored in one or more data stores that are implemented as part of a storage service of provider network 102. For example, an API call to an API of the quantum computing monitoring system to log the metrics may cause metrics data (e.g., step number, metric name, metric value, etc.) to be stored in one or more data storage services of the provider network 102, such as a database, object-oriented storage, etc.

As described above, in some embodiments, the measurements may be obtained, and the metrics may be determined for individual steps of execution of the algorithm at quantum computing resources 112, which may not necessarily correspond to evenly distributed time durations. In some embodiments, user 116 may describe the individual steps in the request provided to quantum computing monitoring system 106. For example, in the request, user 116 may specify that the molecule includes 5 electrons (e.g., to be implemented by 5 qubit gates), and thus that each step includes 100 repeated calculations for each of the 5 tasks (e.g., each task corresponding to one qubit gate). Each calculation or execution of the qubit gate may correspond to one shot. In some embodiments, in each step, the quantum computing resources may execute the individual tasks for 100 times or shots, analyze the results from the 100 times or execution shots (e.g., perform statistical analysis), and provide an aggregate result (e.g., a statistically aggregated result, or a result selected from the results of the 100 shots according to a statistical analysis) to the classical computing resources. Such statistical analysis may include quantum error correction, as an example. The classical computing resources may take the aggregate result from the quantum computing resources as the result for the step, and proceed to the next step of the algorithm execution. Note that in some embodiments, the number of repeated execution shots may not necessarily be the same for different tasks in every step. Further, in some embodiments, the number of repeated execution shots may vary from one step to another. For example, user 116 may prescribe a smaller number of repeated execution shots for a task at the beginning of execution, and then increase it as the execution progresses. Since the amount of quantum computing executions (e.g., shots) can vary from step to step, the time required for completing the individual steps may not necessarily stay constant either. Additionally, different quantum circuits may take longer times to implement then others, wherein a given algorithm uses different quantum circuits in different steps. Thus, performing the monitoring with respect to steps (as opposed to time) may provide better representation of the quantum computing progress.

In some embodiments, quantum computing monitoring system 106 may obtain the determined metrics, e.g., from classical computing resources 110, and evaluate the metrics with respect to corresponding thresholds. In some embodiments, the thresholds may be provided by user 116, e.g., described in the request from user 116. Alternatively, in some embodiments, the thresholds may be identified by quantum computing monitoring system 106 itself according to the metrics to be monitored for a given algorithm. In some embodiments, the thresholds may represent desired progress of the quantum computing. Still consider the foregoing example, in some embodiments, when the metrics include the Hamiltonian state and/or the lowest energy of a system implemented using quantum computing resources 112, the thresholds may include desired value(s) for the Hamiltonian state and/or the lowest energy of the system. Alternatively, the thresholds may include desired change(s) for the Hamilton state and/or the lowest energy within a given number of steps. In some embodiments, to perform the evaluation, quantum computing monitoring system 106 may compare the metrics with the thresholds to determine whether the metrics satisfy the thresholds. For example, quantum computing monitoring system 106 may compare values of the Hamiltonian state and/or the lowest energy versus the thresholds to determine whether they trend towards a minimum in execution.

In some embodiments, when determining that the metrics fail to satisfy the thresholds, quantum computing monitoring system 106 may provide one or more alerts to user 116 via user interface 108. For example, when the lowest energy of the molecule system fails to reduce by a desired percentage within a given number of steps, quantum computing monitoring system 106 may consider that the quantum computing fails to converge and provide an alert to user 116.

In some embodiments, quantum computing monitoring system 106 may allow user 116 to modify the algorithm execution in response to alerts. For example, when quantum computing monitoring system 106 provides an alert that the quantum computing fails to converge, user 116 may provide a request to quantum computing monitoring system 106 describing cancelation of the execution at quantum computing resources 112. In some embodiments, this may also stop the execution at classical computing resources 110. As a result, provider network 102 may wrap up the execution, finish any remaining measurements collection and/or metric calculations, and release quantum computing resources 112 and/or classical computing resources 110. In some embodiments, the above may be implemented as an automated process. For example, user 116 may describe the operations in the request describing the algorithm and metrics. In some embodiments, the operations may be described by identifying one or more codes or files to be executed. In some embodiments, the operations may include cancelation of the execution at quantum computing resources 110 (and/or classical computing resources 110). In addition, in some embodiments, the operations may include adjustments to execution settings and/or algorithm parameters, based on which the algorithm may be re-executed. Accordingly, when quantum monitoring system 106 evaluates the metrics, quantum monitoring system 106 may automatically perform the operations as needed.

In some embodiments, quantum computing monitoring system 106 may provide one or more representations of the metrics to user 116 via user interface 108. For example, when quantum computing monitoring system 106 obtains the determined metrics at each step of the quantum computing, quantum computing monitoring system 106 may provide a representation of the determined metrics for each step. Thus, as the quantum computing proceeds, the representation may provide a continuously updated indication of the progress.

Figure 2:
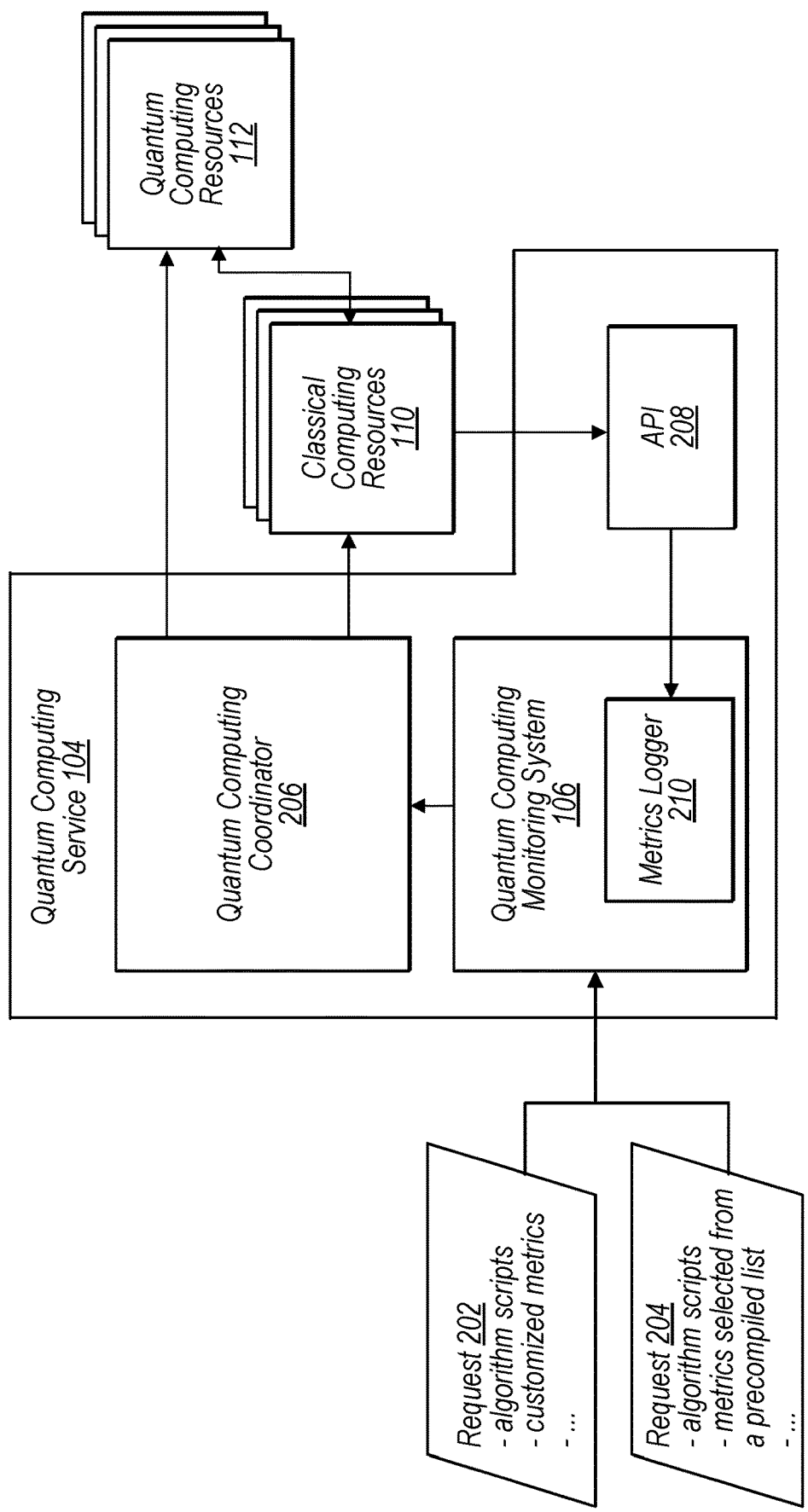
FIG. 2 is a block diagram showing more details of an example quantum computing monitoring system, according to some embodiments.

FIG. 2 is a block diagram showing more details of an example quantum computing monitoring system, according to some embodiments. In FIG. 2, in some embodiments, quantum computing service 104 may include quantum computing monitoring system 106 and quantum computing coordinator 206. In some embodiments, quantum computing monitoring system 106 may receive requests 202 and 204, e.g., from user 116 (and/or other users) via interface 108 as described above. In some embodiments, request 202 may describe an algorithm to be executed using different types of computing resources and one or more customized metrics to be monitored. For example, request 202 may include one or more script files (and/or graphic diagram files) of the algorithm, and include the customized metrics as part of the scripts (or as part of related script files). Additionally, request 204 may describe an algorithm to be executed, but the one or more metrics may be selected (e.g., by user 116) from a precompiled list of metrics provided by quantum computing monitoring system 106. In addition, in some embodiments, for request 204, when the metrics are selected from a precompiled list, quantum computing service 104 may create template code or instructions based on the selection, which may be provided along with the algorithm to quantum computing coordinator to instruct the measurement collection and metrics determination during execution of the algorithm.

In some embodiments, quantum computing monitoring system 106 may send the received requests 202 and 204 to quantum computing coordinator 206 to coordinate execution of the algorithms. For example, when quantum computing coordinator 206 receives request 202, quantum computing coordinator 206 may analyze the algorithm described by request 202, identify or partition the algorithm into portions suitable for classical computing and quantum computing, and send the portions to classical computing resources 110 and quantum computing resources 112 for execution. In some embodiments, prior to sending the algorithm for execution, quantum computing coordinator 206 may select or identify classical computing resources 110, e.g., from a pool of classical computing resources, and perform configuration operations to provision classical computing resources 110. Similarly, quantum computing coordinator 206 may select or identify quantum computing resources 112, e.g., from a pool of quantum computing resources. In some embodiments, quantum computing resources 112 may be specified by user 116 when providing request 202. Alternatively, in some embodiments, quantum computing resources 112 may be identified and recommended to user 116 by quantum computing coordinator 206, e.g., according to the algorithm to be executed.

In some embodiments, according to the algorithm scripts, either customized and provided by user 116 or created and provided by quantum computing monitoring system 106, classical computing resources 110 may obtain one or more measurements from quantum computing resources 112, and determine metrics during execution of the algorithm. Moreover, as described above, in some embodiments, the measurements may be collected, and the metrics may be determined for individual steps of the quantum computing. Note that the collection, analysis, and display of the metrics may be performed during execution of the algorithm such that a user (or automated) decision may be taken based on the metrics while the algorithm is in the process of being executed.

In some embodiments, quantum computing monitoring system 106 may include metrics logger 210. In some embodiments, classical computing resources 110 may use application programming interface (API) 208 to provide the determined metrics (and/or other data such as the obtained measurements and determined step number) to metrics logger 210. For example, metrics are determined for a given step, classical computing resources 110 may make a call of API 208 to send the determined metrics (and/or other data) to metrics logger 210. In some embodiments, metrics logger 210 may store the determined metrics (and/or other data) in one or more data stores of a data storage service of provider network 102. In some embodiments, metrics logger 210 may further generate one or more representations, such as graphic representations, of the metrics.

In some embodiments, quantum computing monitoring system 106 may further allow user 116 to implement one or more checkpoints associated with execution of the algorithm. For example, in some embodiments, user 116 may specify one or more checkpoint criteria to activate a checkpoint. Once the checkpoint is activated, the execution of the algorithm may be paused, and the data associated with a current state of the execution at the checkpoint may be stored. Alternatively, a check point criteria may specify for the data associated with the current execution is to be stored without pausing the execution. At a future time, user 116 may use the stored state and resume the execution from the checkpoint, without having to start from the beginning. This can provide flexibility for users to manage execution of their algorithms, but also improve performance of the execution. In some embodiments, the data stored at a checkpoint may depend on the algorithm being executed. For example, when the algorithm involves training of a machine learning algorithm using classical computing resources 110 and quantum computing resources 112, the data stored at a checkpoint may include parameters and/or weights of the machine learning model whose training is paused or determined up to the point of the checkpoint. Note that the data stored at the checkpoint may include data from classical computing resources 110 and/or quantum computing resources 112. In some embodiments, the metrics that are monitored by quantum computing monitoring system 106 may be used to activate one or more checkpoints. For example, in some embodiments, during execution of an algorithm, quantum computing monitoring system 106 may cause one or more metrics to be determined for individual steps of the quantum computing at quantum computing resources 112. When the metrics become available at each step, quantum computing monitoring system 106 may evaluate the metrics with respect to one or more checkpoint criteria. For example, the checkpoint criteria may include an error rate associated with training of a machine learning model. Thus, based on the evaluation of the metrics with respect to the checkpoint criteria, quantum computing monitoring system 106 may cause a checkpoint to be activated. Accordingly, the execution of the algorithm may be paused, and the data associated with a current state of the execution at the checkpoint may be stored.

Figure 3:
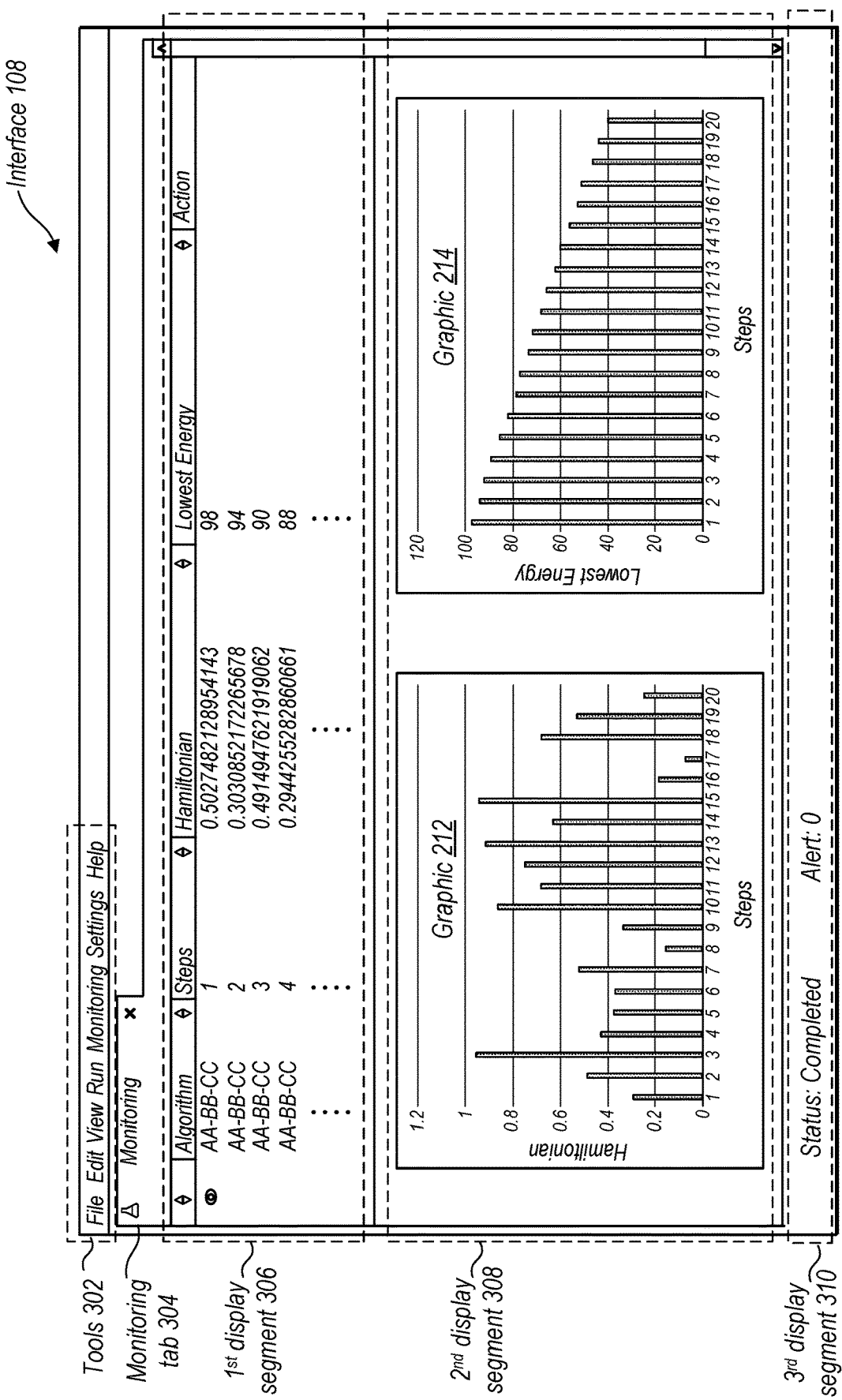
FIG. 3 shows an example user interface that provides representations of quantum computing monitoring, according to some embodiments.

FIG. 3 shows an example user interface that provides representations of quantum computing monitoring, according to some embodiments. In FIG. 3, in some embodiments, user interface 108 may provide one or more tools 302 and one or more display segments 306, 308, and 310. In some embodiments, user 116 may use tools 302 to perform various execution related functions, such as to open and edit files, monitor execution, etc. In some embodiments, user interface 108 may provide monitoring tab 304 to display one or more representations of metrics being monitored during execution of an algorithm. As indicated in FIG. 3, in some embodiments, monitoring tab 304 may be organized into several display segments 306, 308, and 310. In some embodiments, display segment 306 may provide textual representation of the metrics, such as numerical values of Hamiltonian state and lowest energy at individual steps of execution of the algorithm "AA-BB-CC." In addition, in some embodiments, display segment 308 may provide graphic representations of the metrics, such as graphic diagrams 212 and 214 representative of values of the Hamiltonian state and lowest energy during execution of the algorithm. Based on the textual and/or graphic representations, user 114 may conveniently recognize how the quantum computing progresses. In this example, as illustrated by graphic 214, the lowest energy continuously reduces to a minimum. In some embodiments, monitoring tab 304 may further include display segment 310 indicating status of the execution and/or whether there is an alert. In this example, as indicated in display segment 310, execution of the algorithm completes successfully without any alert.

As described above, in some embodiments, when quantum computing monitoring system 106 detects that the metrics fail to satisfy the thresholds, quantum computing monitoring system 106 may provide an alert, e.g., in display segment 310 (or in a pop-up window via user interface 108. Moreover, quantum computing monitoring system 106 may perform one or more operations to the execution. In some embodiments, performance of the operations may cancel the execution at quantum computing resources 112 and/or classical computing resources 110.

Figure 4:
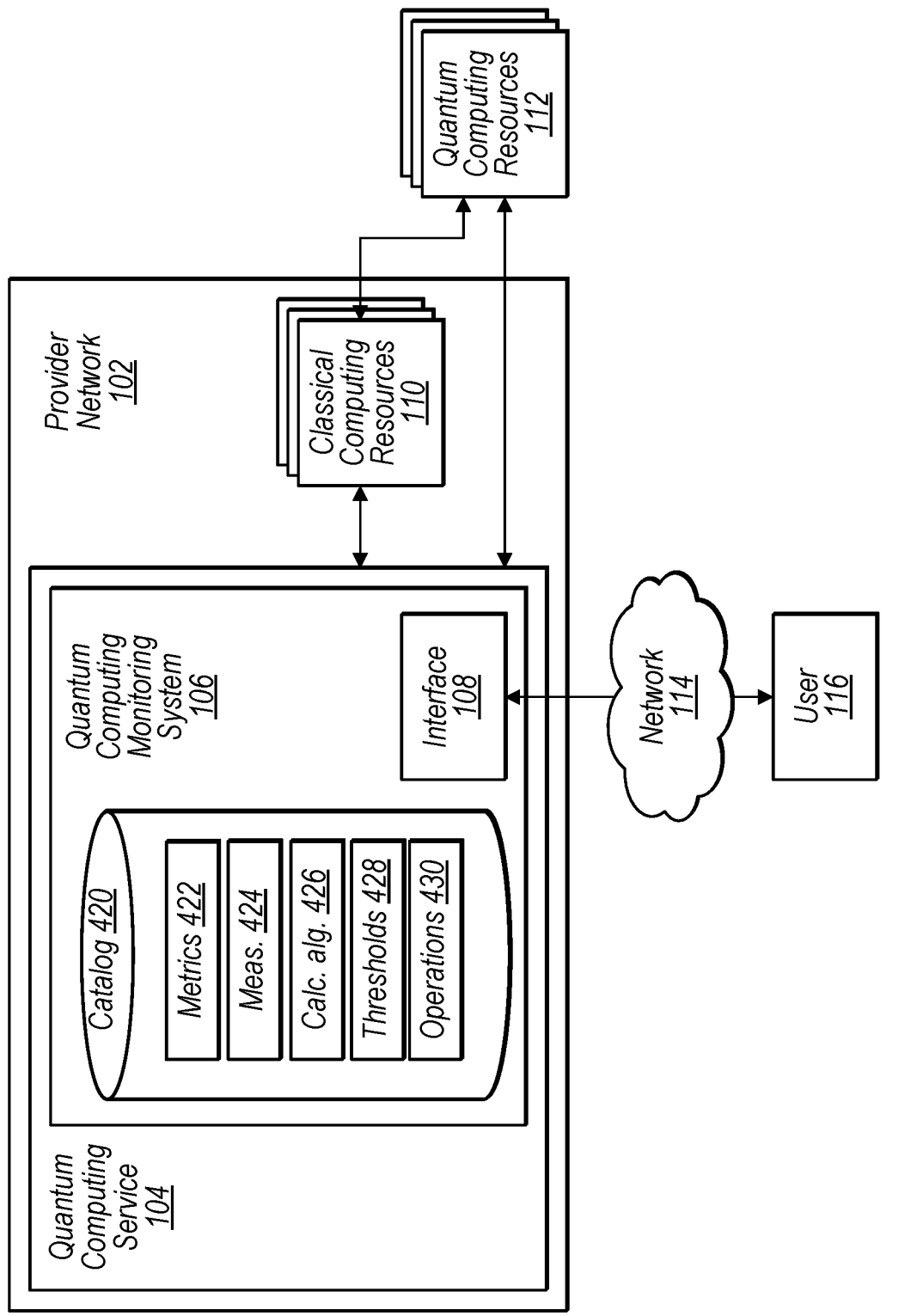
FIG. 4 is a block diagram showing an example provider network that includes a quantum computing monitoring system providing lists of metrics or other monitoring parameters to be used in generating a metrics template for use in monitoring execution of an algorithm, according to some embodiments.

FIG. 4 is a block diagram showing an example provider network that includes a quantum computing monitoring system providing lists of metrics or other monitoring parameters to be used in generating a metrics template for use in monitoring execution of an algorithm, according to some embodiments. In FIG. 4, in some embodiments, quantum computing monitoring system 106 may include catalog 420 having a precompiled list of metrics 422. In some embodiments, quantum computing monitoring system 106 may provide the list of metrics 422 to user 116 via user interface 108, among which user 116 may select one or more metrics for quantum computing monitoring. In some embodiments, the list of metrics 422 may be precompiled based on metrics that are generally considered good indications of quantum computing progress. For example, in some embodiments, the list of metrics 422 may include the Hamiltonian state, lowest energy, error readings of commonly-used qubit gates, etc.

In some embodiments, catalog 420 of quantum computing monitoring system 106 may further include a precompiled list of measurements 424 and a precompiled list of calculation algorithms 426. In some embodiments, for a given algorithm, according to metrics selected by user 116, quantum computing monitoring system 106 may automatically identify measurements and calculation algorithms from respectively the list of measurements 424 and the list of calculation algorithms 426 for determining the selected metrics.

In addition, in some embodiments, catalog 420 of quantum computing monitoring system 106 may further include a precompiled list of thresholds 428. In some embodiments, for a given algorithm, according to metrics selected by user 116, quantum computing monitoring system 106 may automatically identify thresholds from the list of thresholds 428 for evaluating the selected metrics.

Moreover, in some embodiments, catalog 420 of quantum computing monitoring system 106 may include a precompiled list of operations 430. In some embodiments, for a given algorithm, quantum computing monitoring system 106 may automatically identify operations from the list of operations 430 when it determines that metrics fail to satisfy thresholds. For example, as indicated above, the list of operations 430 may include cancelation of execution at quantum computing resources 112 (and/or classical computing resources 110). Thus, when quantum computing monitoring system 106 detects that a quantum computing fails to converge, it may automatically apply the operation to cancel the execution. In some embodiments, catalog 420 may be implemented using database technologies. For example, catalog 420 may be implemented as a relational or non-relational database using a data storage service of provider network 104.

In some embodiments, some of the items may be not be precompiled but rather provided by user 116. For example, in some embodiments, metrics may be selected by user 116 from a precompiled list 422 provided by quantum computing monitoring system 106, but thresholds may be customized thresholds provided by user 116. Alternatively, in some embodiments, user 116 may provide customized metrics, together with customized calculation algorithms that can be used to calculate the customized metrics based on measurements from quantum computing resources 112.

Figure 5:
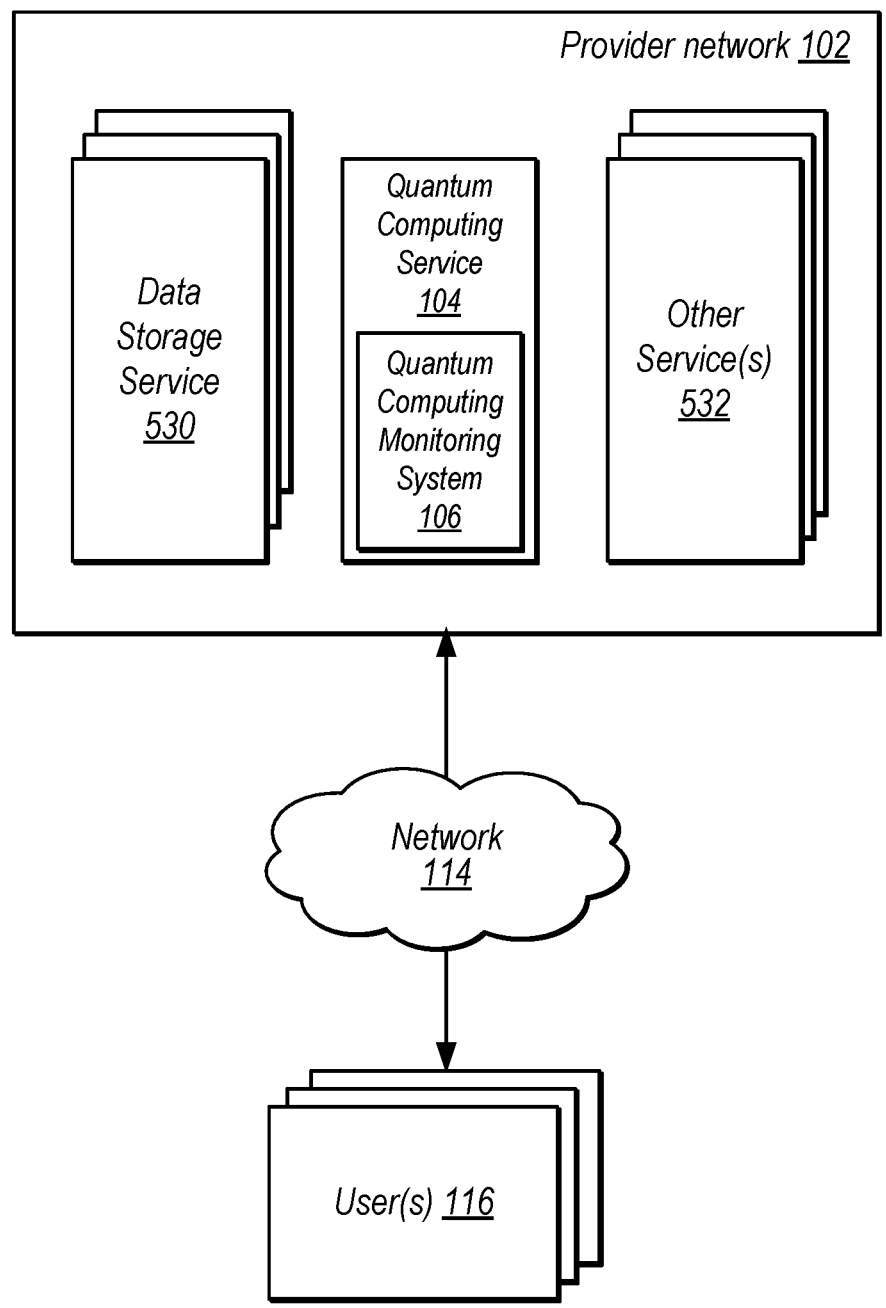
FIG. 5 is a block diagram showing an example provider network including a quantum computing monitoring system and other cloud-based services, according to some embodiments.

FIG. 5 is a block diagram showing an example provider network including a quantum computing monitoring system and other cloud-based services, according to some embodiments. In some embodiments, provider network 102 may be a private or closed system or may be set up by an entity such as a company or a public sector organization to provide one or more services (such as various types of cloud-based storage) accessible via network 114 to one or more users 116. Provider network 102 may be implemented in a single location or may include numerous data centers hosting various resource pools, such as collections of physical and/or virtualized computer servers, storage devices, networking equipment and the like, needed to implement and distribute the infrastructure and storage services offered by provider network 104. In some embodiments, provider network 104 may implement various network-accessible services, such as quantum computing service 104, data storage service 530, and one or more other services 532, as indicated in FIG. 4. In some embodiments, provider network 102 may further include quantum computing monitoring systems 106. In this example, quantum computing monitoring system 106 may be implemented as part of quantum computing service 104. Alternatively, in some embodiments, quantum computing monitoring systems 106 may be implemented separately from quantum computing service 104, two of which may be operatively coupled with each other via one or more network connections.

In some embodiments, data storage service 530 may implement different types of data stores for storing, accessing, and managing data on behalf of users 116 as a network-based service that enables one or more users 116 to operate a data storage system in a cloud or network computing environment. For example, data storage service 530 may include various types of database storage services (both relational and non-relational) or data warehouses for storing, querying, and updating data. Such services may be enterprise-class database systems that are scalable and extensible. Queries may be directed to a database or data warehouse in data storage service 530 that is distributed across multiple physical resources, and the database system may be scaled up or down on an as needed basis. The database system may work effectively with database schemas of various types and/or organizations, in different embodiments. In some embodiments, users/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system.

In some embodiments, data storage service 530 may also include various kinds of object or file data stores for putting, updating, and getting data objects or files, which may include data files of unknown file type. Such data storage service 530 may be accessed via programmatic interfaces (e.g., APIs) or graphical user interfaces. Data storage service 530 may provide virtual block-based storage for maintaining data as part of data volumes that can be mounted or accessed similar to local block-based storage devices (e.g., hard disk drives, solid state drives, etc.) and may be accessed utilizing block-based data storage protocols or interfaces, such as internet small computer interface (iSCSI).

As described above, in some embodiments, provider network 102 may provide users 116 access to different types of computing resources, such as classical computing resources 110 and quantum computing resources 112. In some embodiments, provider network 102 may use quantum computing monitoring system 106 to monitor progress of algorithms at the different computing resources for user 116. In some embodiments, monitoring progress of the quantum computing may be implemented by monitoring one or more metrics during execution of the algorithms. In addition, in some embodiments, quantum computing monitoring system 106 and/or quantum computing service 104 may utilize data storage service 530 for storing data, e.g., measurements obtained from quantum computing resources 114 and/or metrics determined based on the measurements. In addition, in some embodiments, quantum computing monitoring system 106 may include catalog 420 that provides one or more precompiled lists of items for quantum computing monitoring. In some embodiments, catalog 420 may be implemented as a database using data storage service 530 of provider network 102.

In some embodiments, other service(s) 532 may include various types of computing services. For example, in some embodiments, data processing service 532 may include one or more computing services that may provide users 116 access to various computing resources at one or more data centers. In some embodiments, the computing resources may include classical computing resources 110, and/or quantum computing resources 112. In some embodiments, the computing services may include an elastic compute cloud service that may offer virtual compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). In some embodiments, other service(s) 532 may include data processing services to perform different functions (e.g., anomaly detection, machine learning, querying, or any other type of data processing operation). For example, in some embodiments, the data processing services may include a map reduce service that creates clusters of processing nodes that implement map reduce functionality over data stored in data storage service 530. Various other distributed processing architectures and techniques may be implemented by data processing services (e.g., grid computing, sharding, distributed hashing, etc.). Note that in some embodiments, data processing operations may be implemented as part of data storage service 530 (e.g., query engines processing requests for specified data).

Generally speaking, users 116 may encompass any type of user configurable to submit network-based requests to provider network 102 via network 114, including requests for executing algorithms using different types of computing resources, monitoring progress of the execution at quantum computing resources, etc. For example, a given user 116 may include a suitable version of a web browser, or may include a plug-in module or other type of code module configured to execute as an extension to or within an execution environment provided by a web browser. Alternatively, a user 116 may encompass an application, such as a quantum computing application with an integrated development environment. In some embodiments, users 116 may include sufficient protocol support (e.g., for a suitable version of Hypertext Transfer Protocol (HTTP)) for generating and processing network-based services requests without necessarily implementing full browser support for all types of network-based data. That is, users 116 may be an application configured to interact directly with provider network 102. In some embodiments, users 116 may be configured to generate network-based services requests according to a Representational State Transfer (REST)-style network-based services architecture, a document- or message-based network-based services architecture, or another suitable network-based services architecture.

In some embodiments, network 114 may encompass any suitable combination of networking hardware and protocols necessary to establish network-based-based communications between users 116 and provider network 102. For example, network 114 may generally encompass the various telecommunications networks and service providers that collectively implement the Internet. Network 114 may also include private networks such as local area networks (LANs) or wide area networks (WANs) as well as public or private wireless networks. For example, both a given user 116 and provider network 102 may be respectively provisioned within enterprises having their own internal networks. In such an embodiment, network 114 may include the hardware (e.g., modems, routers, switches, load balancers, proxy servers, etc.) and software (e.g., protocol stacks, accounting software, firewall/security software, etc.) necessary to establish a networking link between given user 116 and the Internet as well as between the Internet and provider network 102. It is noted that in some embodiments, users 116 may communicate with provider network 102 using a private network rather than the public Internet.

Figure 6:
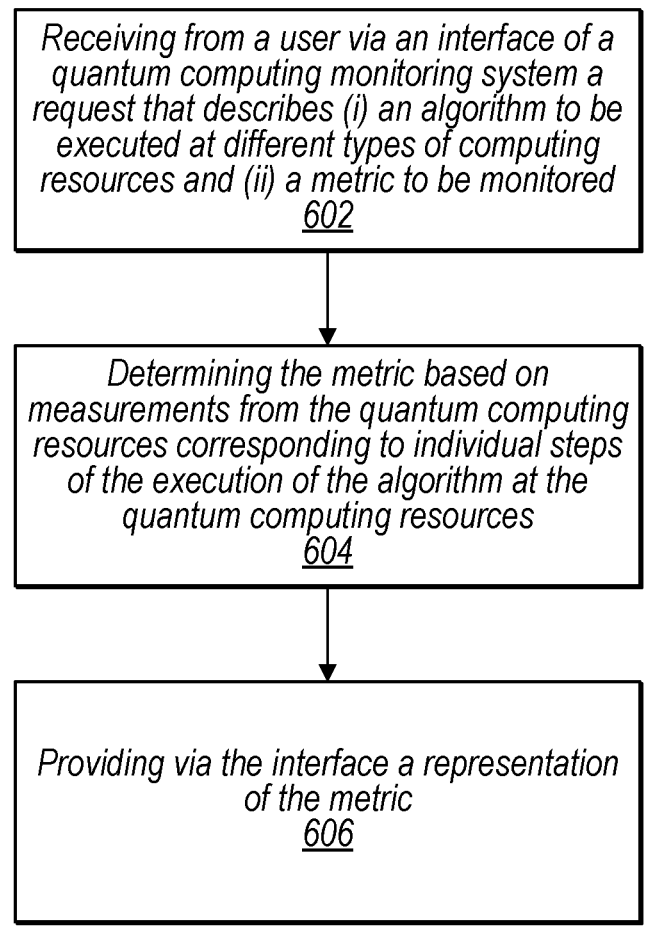
FIG. 6 is a flowchart illustrating an example method for implementing quantum computing monitoring, according to some embodiments.

FIG. 6 is a flowchart illustrating an example method for implementing quantum computing monitoring, according to some embodiments. In FIG. 6, in some embodiments, a request may be received at a quantum computing monitoring system of a provider network via a user interface (e.g., at quantum computing monitoring system 106 via user interface 108 as described in FIG. 1-5), as indicated in block 602. In some embodiments, the request may describe (i) an algorithm to be executed at different types of computing resources, including one or more classical computing resources and one or more quantum computing resources, and (ii) at least one metric to be monitored during execution of the algorithm. In some embodiments, the quantum computing monitoring system and/or a quantum computing service may analyze the algorithm, and send at least one portion of the algorithm to the classical computing resources for execution and at least another portion of the algorithm may to the quantum computing resources for execution. In addition, in some embodiments, the metric may include a Hamiltonian state, a lowest energy of a system implemented at the quantum computing resources, etc. Further, in some embodiments, the metric may be selected from a precompiled list of metrics (e.g., the list of metrics 422) provided by the quantum computing monitoring system. Alternatively, in some embodiments, the metric may be a customized metric provided by the user.

In some embodiments, responsive to the request, the metric may be determined based on one or more measurements obtained from the quantum computing resources, as indicated in block 604. As described above, in some embodiments, the quantum computing monitoring system may use the classical computing resources to obtain the measurements from the quantum computing resources and determine the metric based on the obtained measurements. In some embodiments, the measurements are obtained, and/or the metric may be determined corresponding to individual steps of the execution of the algorithm at the quantum computing resources. As described above, in some embodiments, the individual steps may not necessarily correspond to evenly distributed time intervals. In other words, the time durations of individual steps may not necessarily be the same with each other. In some embodiments, one step may include one or more tasks and respective numbers of repeated execution shots of the tasks at the quantum computing resources. As described above, in some embodiments, the steps may be described in the request provided by the user.

In some embodiments, when the metric is determined, the quantum computing monitoring system may provide a representation of the metric to the user via the user interface, as indicated in block 606. As described above, in some embodiments, the representation of the metric may include a textual representation (e.g., the representation in display segment 306), a graphic representation (e.g., the representation in display segment 308), etc.

Figure 7:
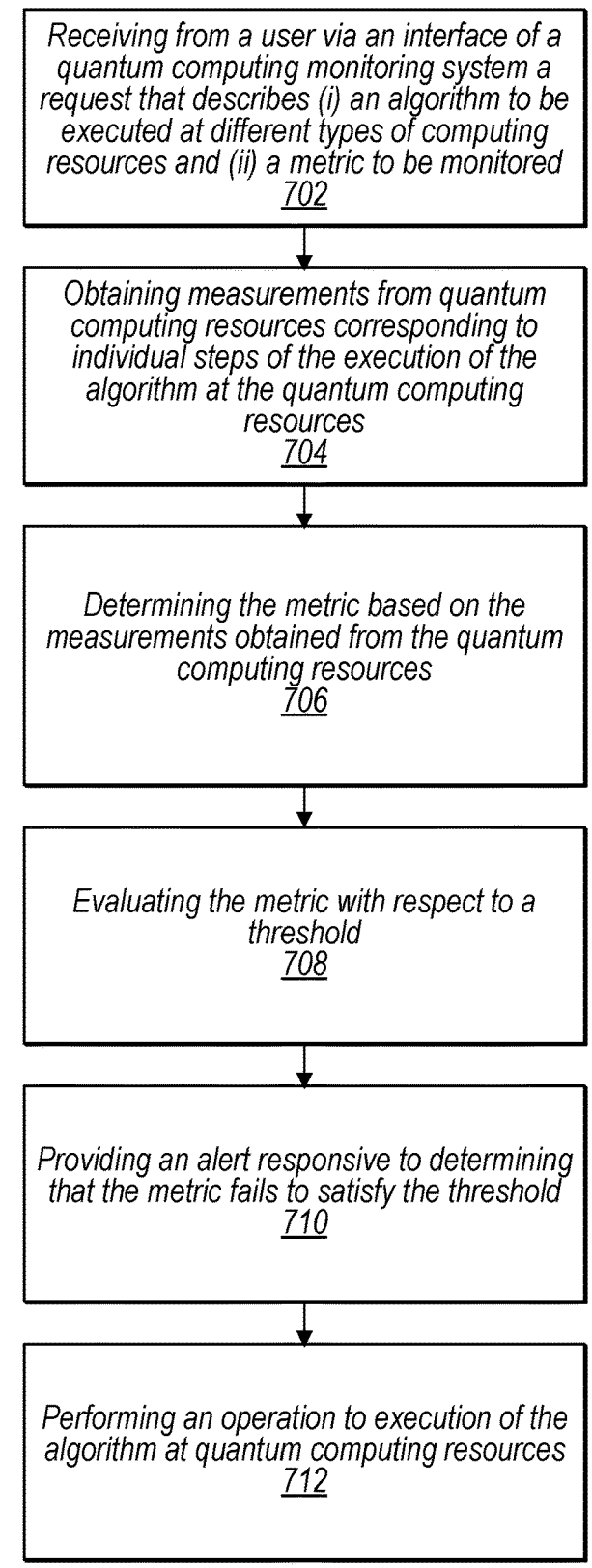
FIG. 7 is a flowchart illustrating another example method for implementing quantum computing monitoring, according to some embodiments.

FIG. 7 is a flowchart illustrating another example method for implementing quantum computing monitoring, according to some embodiments. In FIG. 7, in some embodiments, a request may be received from a user at a quantum computing monitoring system of a provider network via a user interface that describes (i) an algorithm to be executed using different types of computing resources, including classical and quantum computing resources, and (ii) at least one metric to be monitored during execution of the algorithm, as indicated in block 702.

In some embodiments, responsive to the request, one or more measurements may be obtained from the quantum computing resources corresponding to individual steps of the execution of the algorithm at the quantum computing resources, as indicated in block 704. As described above, in some embodiment, the measurements may be identified from a precompiled list of measurements (e.g., the list of measurements 424). Alternatively, in some embodiments, the measurements may be customized measurements identified by the user. Further, in some embodiments, the measurements may be obtained using classical computing resources. For example, at the end of each step of the quantum computing, the measurements may be reported from the quantum computing resources to the classical computing resources, or may be pooled by the classical computing resources from the quantum computing resources.

In some embodiments, the metric may be determined based on the measurements obtained from the quantum computing resources, as indicated in block 706. As described above, in some embodiments, determination of the metric may be performed using one or more calculation algorithms identified from a precompiled list of calculation algorithms (e.g., the list of calculation algorithm 426). Alternatively, in some embodiments, the calculation algorithms may be customized calculation algorithms provided by the user. For example, the user may describe codes of the customized calculation algorithms in the request provided to the quantum computing monitoring system.

In some embodiments, when the metric is determined, the quantum computing monitoring system may evaluate the metric with respect to a threshold, as indicated in block 708. As described above, in some embodiments, the threshold may be identified from a precompiled list of thresholds (e.g., the list of thresholds 428). Alternatively, in some embodiments, the threshold may be a customized threshold provided by the user. In some embodiments, evaluation of the metric may include determining whether the metric satisfies the threshold. For example, when the metric is the lowest energy of a system, the evaluation may determine whether the lowest energy of the system reaches a threshold value, or reduces by a threshold percentage within a specified number of steps.

In some embodiments, responsive to determining that the metric fails to satisfy the threshold, the quantum computing monitoring system may provide an alert to the user via the user interface, as indicated in block 710. In addition, in some embodiments, the quantum computing monitoring system may further perform at least one operation to the execution of the algorithm at the quantum computing resources, as indicated in block 712. As described above, in some embodiments, the operation may be provided by the user after the alert is provided by the quantum computing monitoring system. Alternatively, in some embodiments, performance of the operation may be implemented as an automated process. For example, the operation may be identified from a precompiled list of operations (e.g., the list of operations 330) or provided by the user, and thus become readily available within the provider network prior to the quantum computing. Accordingly, when the quantum computing monitoring system determines that the metric does not satisfy the threshold, the quantum computing monitoring system may automatically perform the operation. In some embodiments, the operation may include cancelling execution of the algorithm at the quantum computing resources, which may further cancel execution of the algorithm at the associated classical computing resources. As a result, the quantum computing resources and/or classical computing resources may be released. In addition, in some embodiments, the operation may include adjustments of execution settings and/or algorithm parameters and re-execution of the algorithm using the new settings and/or algorithm parameters.

Figure 8:
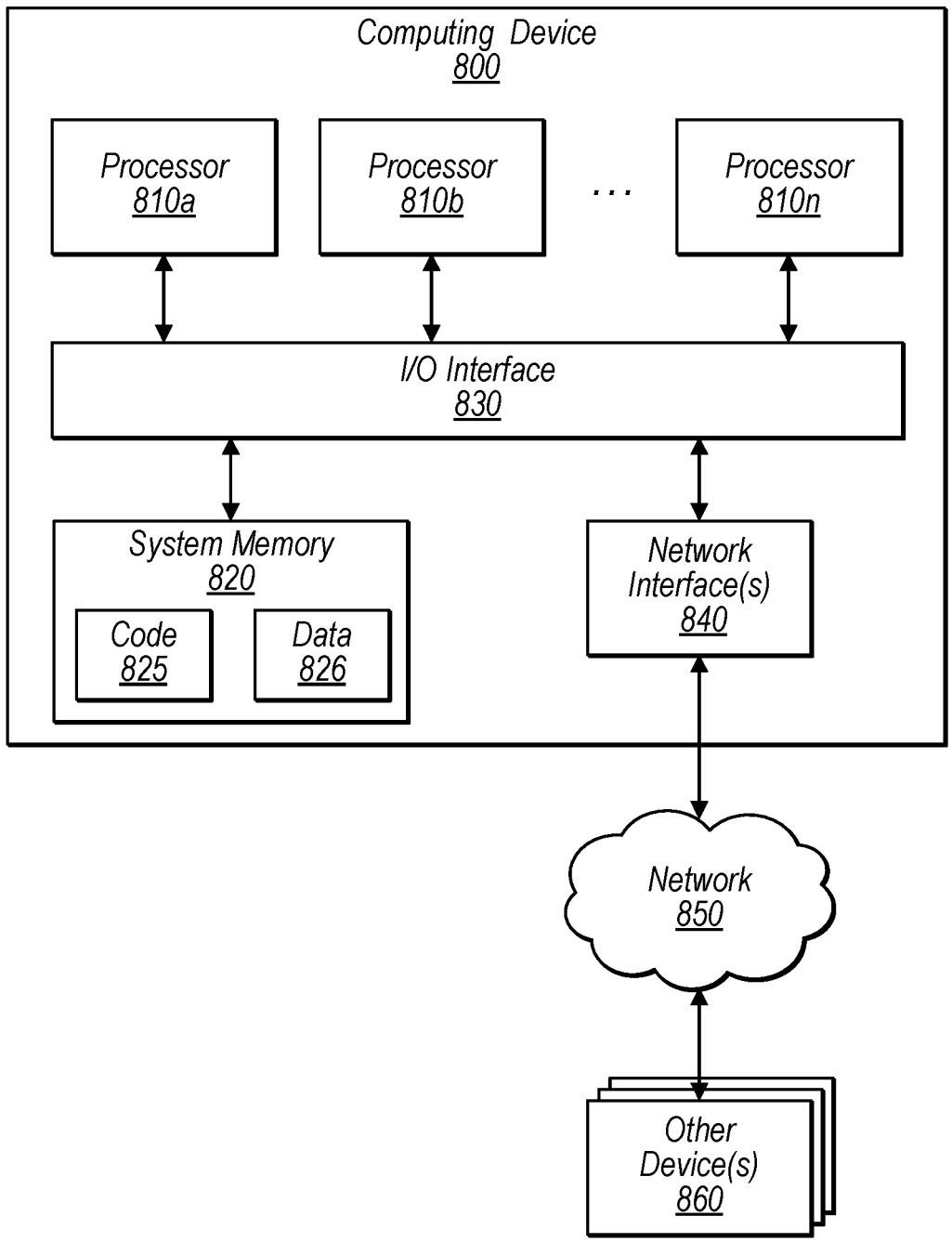
FIG. 8 is a block diagram showing an example computing device to implement the various techniques described herein, according to some embodiments.

FIG. 8 shows an example computing device to implement the various techniques described herein, according to some embodiments. For example, in one embodiment, the quantum computing monitoring system disclosed herein may be implemented by a computing device, for instance, computer system 800 in FIG. 8 that includes one or more processors executing program instructions stored on a computer-readable storage medium coupled to the processors. In the illustrated embodiment, computer system 800 includes one or more processors 810 coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In various embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, such as the quantum computing monitoring system described above in FIGS. 1-7, are shown stored within system memory 830 as code 826 and data 827.

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 850. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIG. 1-7. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
one or more computing devices configured to implement a quantum computing monitoring system, wherein the quantum computing monitoring system is configured to:
receive, from a user, a request associated with (i) an algorithm to be executed at different types of computing resources including a classical computing resource and a quantum computing resource and (ii) a metric to be monitored during execution of the algorithm at the quantum computing resource;
cause, using the classical computing resource, measurements from the quantum computing resource to be obtained during the execution of the algorithm, wherein:
the obtained measurements correspond to individual steps of the execution of the algorithm at the quantum computing resource; and
execution of a total number of the individual steps sums to an overall execution of the algorithm at the quantum computing resource;
cause, using the classical computing resource, the metric for the individual steps to be determined, during the execution of the algorithm, based on the obtained measurements; and
provide, during the execution of the algorithm, a representation of the determined metric, wherein the representation indicates updated progress of the execution of the algorithm with respect to the individual steps and with respect to the overall execution of the algorithm at the quantum computing resource.

2. The system of claim 1, wherein the classical computing resource is configured to use an application programming interface (API) to provide the determined metrics to the quantum computing monitoring system.

3. The system of claim 1, wherein the request further describes a threshold and an operation including cancelation of the execution of the algorithm at the quantum computing resource, and wherein the quantum computing monitoring system is further configured to:
determine whether the metric satisfies the threshold; and
responsive to determining that the metric fails to satisfy the threshold, provide an alert; and
perform the operation canceling the execution of the algorithm at the quantum computing resource.

4. The system of claim 1, wherein the request further describes, for a given individual step of the execution of the algorithm at the quantum computing resource, (i) at least one task and (ii) at least one specified number of repeated execution shots of the task at the quantum computing resource.

5. The system of claim 1, wherein the individual steps of the execution of the algorithm at the quantum computing resource do not correspond to evenly distributed time intervals.

6. The system of claim 1, wherein the quantum computing monitoring system is implemented as part of a provider network that further provides the user access to the different types of computing resources, and wherein the measurements and the metric are stored in one or more data stores that are implemented as part of a data storage service of the provider network.

7. A method, comprising:
receiving, via an interface of a quantum computing monitoring system implemented using one or more computing devices, a request associated with (i) an algorithm to be executed at different types of computing resources including one or more classical computing resources and one or more quantum computing resources and (ii) one or more metrics to be monitored during execution of the algorithm at the quantum computing resources;

causing the metrics to be determined, during the execution of the algorithm, based on measurements from the quantum computing resources corresponding to individual steps of the execution of the algorithm at the quantum computing resources, wherein execution of a total number of the individual steps sums to an overall execution of the algorithm at the quantum computing resources; and providing, during the execution of the algorithm, via the interface, one or more representations of the determined metrics, wherein the one or more representations indicate updated progress of the execution of the algorithm with respect to the individual steps and with respect to the overall execution of the algorithm at the quantum computing resources.

8. The method of claim 7, wherein the request further describes one or more thresholds, and wherein the method further comprises:

determining whether the metrics satisfy the thresholds; and responsive to determining that the metrics fail to satisfy the thresholds, providing an indication that the metrics fail to satisfy the thresholds.

9. The method of claim 8, wherein the request further describes one or more operations related to the execution of the algorithm at the quantum computing resources, and wherein the method further comprises:

responsive to determining that the metrics fail to satisfy the thresholds, performing the one or more operations related to the execution of the algorithm at the quantum computing resources.

10. The method of claim 9, wherein the one or more operations comprise canceling the execution of the algorithm at the quantum computing resources.

11. The method of claim 7, wherein the request further describes, for a given individual step of the execution of the algorithm at the quantum computing resources, (i) one or more tasks and (ii) one or more specified numbers of repeated execution shots of the respective tasks at the quantum computing resources.

12. The method of claim 7, wherein the metrics comprise at least one of (i) a lowest energy of the Hamiltonian simulation being performed at quantum computing resources with respect to the algorithm or (ii) a total energy of a Hamiltonian simulation being performed at the quantum computing resources with respect to the algorithm .

13. The method of claim 7, further comprising:

providing a list of metrics to be monitored associated with the execution of the algorithm, wherein the metrics described in the request are selected by a user from the provided list of metrics.

14. The method of claim 7, wherein the metrics described in the request are provided from a user, wherein the request further describes one or more calculation algorithms provided by the user for determining the metrics, and wherein causing the metrics to be determined comprises determining the metric based on applying the calculation algorithms provided by the user to measurements from the quantum computing resources.

15. The method of claim 7, further comprising:

providing the determined metrics to a service of a provider network to generate one or more graphic representations of the metrics for the individual steps.

16. One or more non-transitory computer readable media storing program instructions that when executed on or across one or more processors, cause the one or more processors to:

receive, via an interface of a quantum computing monitoring system, a request associated with (i) an algorithm to be executed at different types of computing resources including one or more classical computing resources and one or more quantum computing resources and (ii) one or more metrics to be monitored during execution of the algorithm at the quantum computing resources;

cause the metrics to be determined, using the classical computing resources and during the execution of the algorithm, based on measurements from the quantum computing resources corresponding to individual steps of the execution of the algorithm at the quantum computing resources, wherein execution of a total number of the individual steps sums to an overall execution of the algorithm at the quantum computing resources; and provide, during the execution of the algorithm, via the interface, one or more representations of the metrics, wherein the one or more representations indicate updated progress of the execution of the algorithm with respect to the individual steps and with respect to the overall execution of the algorithm at the quantum computing resources.

17. The one or more non-transitory computer readable media of claim 16, wherein the request further describes one or more thresholds, and wherein the program instructions further cause the one or more processors to:

determine whether the metrics satisfy the thresholds; and in response to determining that the metrics fail to satisfy the thresholds, provide an indication that the metrics fail to satisfy the thresholds.

18. The one or more non-transitory computer readable media of claim 17, wherein the request further describes one or more operations including cancelation of the execution of the algorithm at the quantum computing resources, and wherein the program instructions further cause the one or more processors to:

in response to determining that the metrics fail to satisfy the thresholds, perform the one or more operations related to the execution of the algorithm at the quantum computing resources.

19. The one or more non-transitory computer readable media of claim 16, wherein the program instructions further cause the one or more processors to:

evaluate the metrics with respect to one or more criteria;

pause the execution of the algorithm and store data associated with a current state of the execution of the algorithm based on the evaluation of the metrics with respect to the criteria.

20. The one or more non-transitory computer readable media of claim 16, wherein program instructions further cause the one or more processors to:

provide a list of metrics to be monitored associated with the execution of the algorithm, wherein the metrics described in the request are selected by a user from the provided list of metrics.

\* \* \* \* \*